(No Model.) 2 Sheets—Sheet 1.

W. EVANS.
CLIP FOR HEADS OF VEHICLE SPRINGS.

No. 323,307. Patented July 28, 1885.

Witnesses.
Robert Evans.
J. E. W. Bewley.

Inventor.
William Evans.
per Thomas J. Bewley. Atty (No Model.) 2 Sheets—Sheet 2.
W. EVANS.
CLIP FOR HEADS OF VEHICLE SPRINGS.
No. 323,307. Patented July 28, 1885.
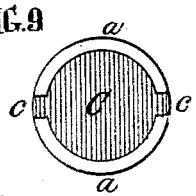
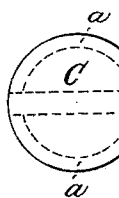
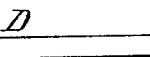
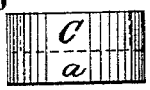
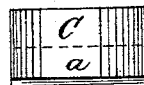
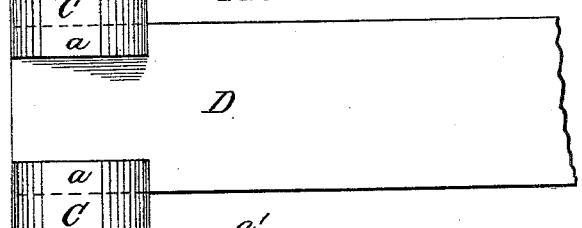
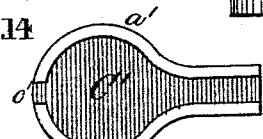
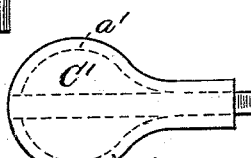
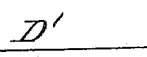
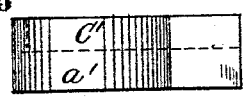
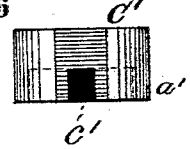
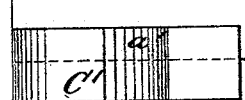
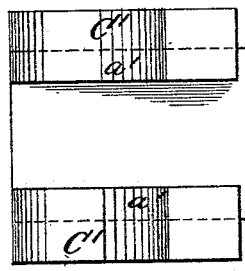
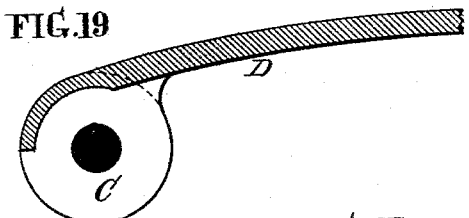
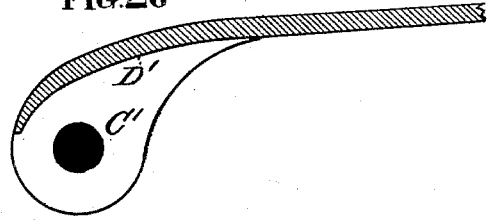
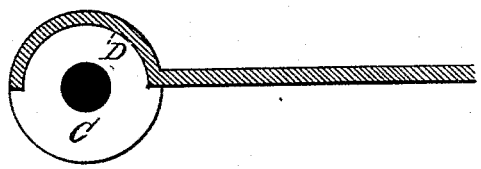
Witnesses
Robert Evans
G. E. W. Bewley
Inventor
William Evans
per Thomas J. Bewley, att'y

UNITED STATES PATENT OFFICE.

WILLIAM EVANS, OF PHILADELPHIA, PENNSYLVANIA.

CLIP FOR HEADS OF VEHICLE-SPRINGS.

SPECIFICATION forming part of Letters Patent No. 323,307, dated July 28, 1885.

Application filed July 24, 1884. (No model.)

*To all whom it may concern:*

Be it known that I, WILLIAM EVANS, a citizen of the United States, residing at Philadelphia, in the county of Philadelphia and State of Pennsylvania, have invented a new and useful Improvement in Clips for the Heads of Vehicle-Springs, of which the following is a specification.

My invention, in the first place, consists of a clip used in forming the head of a vehicle-spring that has peripheral flanges upon one of its sides with openings therein, the said flanges being forced into the position they assume by a peculiar construction of the upper and lower dies of a punching-press while the sheet of metal from which said clips is formed is in a heated state.

The object of the invention is such a formation of the clip that when two are placed upon the sides of a strip of spring-steel at one end and brought to a welding-heat and swaged between properly-shaped dies a perfect weld will be formed between all the pieces, both inside and outside of the clips, thus insuring great strength and solidity to the completed head.

Figure 1:
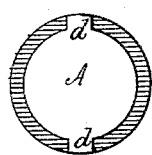
Figure 4:
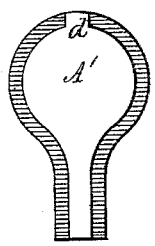
Figure 2:
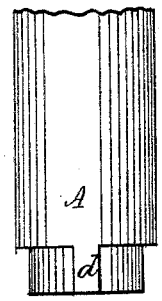
Figure 3:
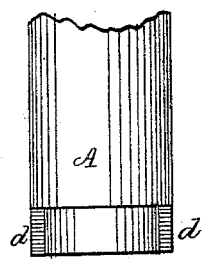
Figure 5:
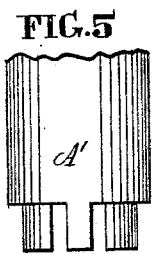
Figure 6:
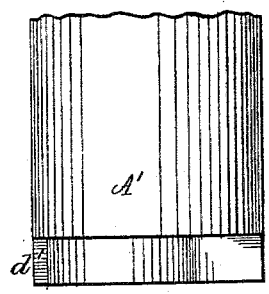
Figure 7:
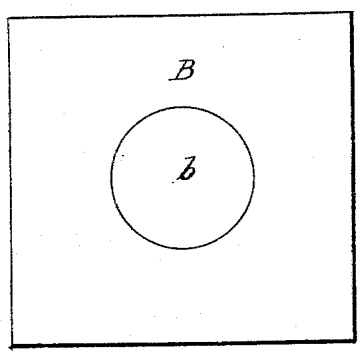
Figure 8:
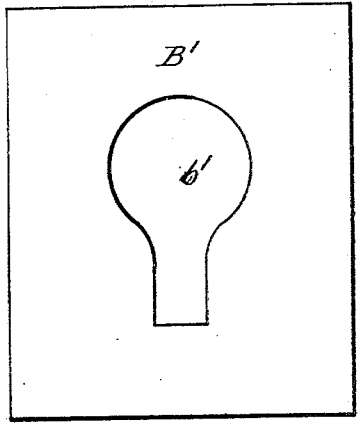

In the accompanying drawings, which make a part of this specification, Figure 1 is an end view of the upper die or punch, A, for forming button-head clips. Figs. 2 and 3 are respectively a front and side elevation of the same. Fig. 4 is an end view of an upper die, A', for forming French head-clips. Figs. 5 and 6 are respectively a front and side elevation of the same. Fig. 7 is a face view of the lower die, B, for forming button-head clips. Fig. 8 is a face view of the lower die, B', for forming French head-clips. Fig. 9 is an inside face view of a button-head clip, C, showing the flanges *a* and openings *c*. Fig. 10 is a side elevation of the same. Fig. 11 is an end elevation of the same. Fig. 12 is a side elevation of the button-head clip C in connection with the strip of spring-steel D. Fig. 13 is a face view of the same ready for heating and welding. Figs. 14, 15, and 16 are respectively a face, side, and end elevation of a French head-clip, C'. Figs. 17 and 18 are an edge and a face view of same clips in connection with the strip of steel D'. Fig. 19 is a longitudinal sectional view of a welded button-head. Fig. 20 is a like view of a French head. Fig. 21 is a like view of what is termed a "Berlin head."

Like letters of reference in all the figures indicate the same parts.

A is the upper die or punch. B is the lower die, which has the opening *b*, of the shape and size that it is desired to have the clip C. The upper die, A, is of smaller diameter on its lower end than the corresponding opening in the lower die, except at the front and back of the die, where the enlargements or projections *d d* are of equal diameter to that of said lower die.

C is a button-head clip having peripheral flanges *a a* and openings *c c* on one of its flat surfaces.

A' and B' are the upper and lower dies for forming what are known as "French head-clips." *b'* is the enlargement. C' is the French head-clip, having flanges *a'* and opening *c'*. Said flanges are connected together by the strip of steel D'.

In the preliminary process of manufacture a piece of heated steel of proper size to form a clip is placed upon the die B, and the upper die or punch, A, which is in line above, is brought downward thereon by the power of the press, causing the piece to be forced through the lower die, and at the same time the sides of the sheet are forced upward, thus forming the flanges *a a* on the periphery of the clip, except at the openings *c c*, into which the enlargements *d d* prevent metal from entering, the object of said flanges being to provide sufficient material when two clips are joined to the strip D to form, by the aid of the swaging-dies, a perfect weld or unit of the mass. The openings *c c* between said flanges *a a* on one of the faces of the clip are for the reception of the edge of the strip of spring-steel D. After the clips are formed I take two of them and place one upon each side of a strip of spring-steel, D, at the end thereof, bring all the united pieces to a welding-heat, and swage said parts by proper dies down to the shape shown in Fig. 19 for a button-head, and in Fig. 20 for a French head. The lower swaging-die being of cup-shape to receive the heated metal and the power of the hammer or upper swaging-die, of corresponding shape, exerted to weld the mass, forces the superfluous metal of the flanges $a\ a$ down upon the strip of steel D, causing it to unite therewith and form a perfect weld of all parts on both sides of the cheeks of the head.

By the formation of the clip with the peripheral flanges $a\ a$ sufficient material is provided, together with the thickness of metal and strip of flat steel. to form a perfect weld both inside and outside of the cheeks of the head when finished by swaging-dies.

The invention is not limited to the shape of the clip, but embraces any clip having the peripheral flanges $a\ a$ and openings $c\ c$ between said flanges.

Heads for carriage or vehicle springs known to the trade as "button-head" (French and Berlin) come within the scope of this invention, sectional views of each of which are shown in Figs. 19, 20, and 21, the clips C forming a weld with the strip D.

I claim as my invention—

The clip C, having the peripheral flanges $a\ a$ and openings $c\ c$ between said flanges, struck from a single piece of sheet metal, as shown and described.

WILLIAM EVANS.

Witnesses:
THOMAS J. BEWLEY,
ROBERT EVANS.